(12) United States Patent
Rencs et al.

(10) Patent No.: US 9,477,221 B1
(45) Date of Patent: Oct. 25, 2016

(54) HYBRID ARCHITECTURE AND METHOD FOR ABSOLUTE POSITION TO QUADRATURE SYNTHESIS FOR MOTION DETECTION AND CONTROL

(71) Applicant: Goodrich Corporation, Charlotte, NC (US)

(72) Inventors: Erik V. Rencs, Carlisle, MA (US); Scott W. Ramsey, Northbridge, MA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/728,963

(22) Filed: Jun. 2, 2015

(51) Int. Cl.
*H02P 6/00* (2016.01)
*G05B 21/02* (2006.01)
*G05B 23/00* (2006.01)

(52) U.S. Cl.
CPC .............. *G05B 21/02* (2013.01); *G05B 23/00* (2013.01); *H02P 6/001* (2013.01)

(58) Field of Classification Search
CPC .......... H03M 1/22; G01D 5/244; G05F 1/10; H02P 25/021; H02P 25/023
USPC .............. 318/560, 561, 565, 568.11, 568.12, 318/568.18, 568.17, 568.2, 568.21, 569, 318/602, 400.01, 400.02, 400.14, 400.15, 318/700, 701, 721, 799, 800, 801, 430, 432, 318/437; 701/501; 341/143, 160; 340/11.1; 700/245
See application file for complete search history.

(56) References Cited

U.S. PATENT DOCUMENTS

| | | | | |
|---|---|---|---|---|
| 4,647,827 A | * | 3/1987 | Toyoda | G01D 5/2458 318/592 |
| 7,376,525 B2 | * | 5/2008 | Desailly | H02P 6/006 702/57 |
| 7,835,630 B2 | * | 11/2010 | Kazanzides | H02P 6/17 318/800 |
| 7,875,844 B2 | * | 1/2011 | Sheu | G01D 5/3473 250/231.16 |
| 8,452,450 B2 | * | 5/2013 | Dooley | B60L 3/106 700/245 |
| 8,912,928 B2 | * | 12/2014 | Murokita | G01D 5/2449 341/1 |
| 8,961,695 B2 | * | 2/2015 | Romanov | A47L 11/4011 134/18 |
| 2015/0292918 A1 | * | 10/2015 | Yoshida | G01D 5/34707 318/640 |

FOREIGN PATENT DOCUMENTS

JP 60219988 A * 11/1985

* cited by examiner

*Primary Examiner* — Antony M Paul
(74) *Attorney, Agent, or Firm* — Locke Lord LLP; Scott D. Wofsy; Alexander Viderman

(57) ABSTRACT

A motor-based position system includes one or more motors having a rotor. The system further includes a motor controller. The motor controller is communicatively coupled to each of the motors. The system further includes one or more encoders configured to detect an absolute position of each motor and one or more devices configured to collect inertial data. The system further includes a processing device coupled to the motor controller, one or more encoders and one or more devices. The processing device is configured to receive signals indicative of motors' absolute position from the encoders and configured to convert the received encoder signals into a format understood by the motor controller. The processing device is further configured to send the converted signals to the motor controller with low latency and configured to combine the received encoder signals with the inertial data to generate more accurate positional information.

14 Claims, 7 Drawing Sheets

HYBRID ARCHITECTURE AND METHOD FOR ABSOLUTE POSITION TO QUADRATURE SYNTHESIS FOR MOTION DETECTION AND CONTROL

FIELD OF THE INVENTION

The present invention relates to embedded control systems, and more particularly, to synthesis of absolute position signals to quadrature signals for motion detection and control.

BACKGROUND OF THE INVENTION

On account of their high specific power, electronically commutated motors, or brushless motors, can be used to control the rotation of a mechanical member in a large number of applications.

Rotating motors are typically controlled by a motor drive that receives a desired motor speed signal and, based on the motor speed signal, produces and outputs a torque signal that is applied to the motor. Adjustment of the torque signal based on changes to the desired motor speed signal relative to the actual motor speed ensures that the motor rotates at the desired speed. However, when operating a plurality motors synchronously in an automated system, several factors exist that may cause the position of the motors to deviate from each other even though they are all operating under the same desired motor speed signal. For instance, motor inertia and other losses at each motor are non-uniform, and could cause one motor to drift from the other motors. Many automated control systems implement a position feedback loop, whereby the position of each motor is compared to a desired motor position so that the torque output to each individual motor may be adjusted to compensate for motor drifting.

Accurate control of electric motor-based position systems requires accurate, low latency sampling of motor position signals. These position signals are typically need to be expressed in different forms depending upon the type of system eliciting position information. For example, low-rate control systems typically elicit absolute position signals. Other systems, such as, high-rate electronic control systems may elicit position outputs in the form of continuous incremental quadrature signals. However, commercial-off-the-shelf electronic systems do not typically provide this type of data in different formats with the required level of concurrency.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a motor control system is provided. The system includes one or more motors having a rotor. The system further includes a motor controller for controlling operation of the motors. The motor controller is communicatively coupled to each of the one or more motors. The system further includes one or more encoders configured to detect an absolute position of each motor's rotor. The system further includes a processing device for exchanging data related to the operation of the motors with the motor controller. The processing device is configured to receive signals indicative of motors' absolute position from the encoders and configured to convert the received encoder signals into a format understood by the motor controller. The processing device is further configured to send the converted signals to the motor controller with low latency.

In another aspect a motor-based multi-axis position system includes one or more motors having a rotor. The system further includes a motor controller for controlling operation of the motors. The motor controller is communicatively coupled to each of the one or more motors. The system further includes one or more encoders configured to detect an absolute position of each motor's rotor and one or more devices configured to collect inertial data. The system further includes a processing device coupled to the motor controller, one or more encoders and one or more devices. The processing device is configured to receive signals indicative of motors' absolute position from the encoders and configured to convert the received encoder signals into a format understood by the motor controller. The processing device is further configured to send the converted signals to the motor controller with low latency and configured to combine the received encoder signals with the inertial data to generate more accurate positional information.

BRIEF DESCRIPTION OF THE DRAWINGS

So that those having ordinary skill in the art, to which the present invention pertains, will more readily understand how to employ the novel system and methods of the present certain illustrated embodiments, the embodiments thereof will be described in detail herein-below with reference to the drawings, wherein.

DETAILED DESCRIPTION OF CERTAIN EMBODIMENTS

Figure 1:
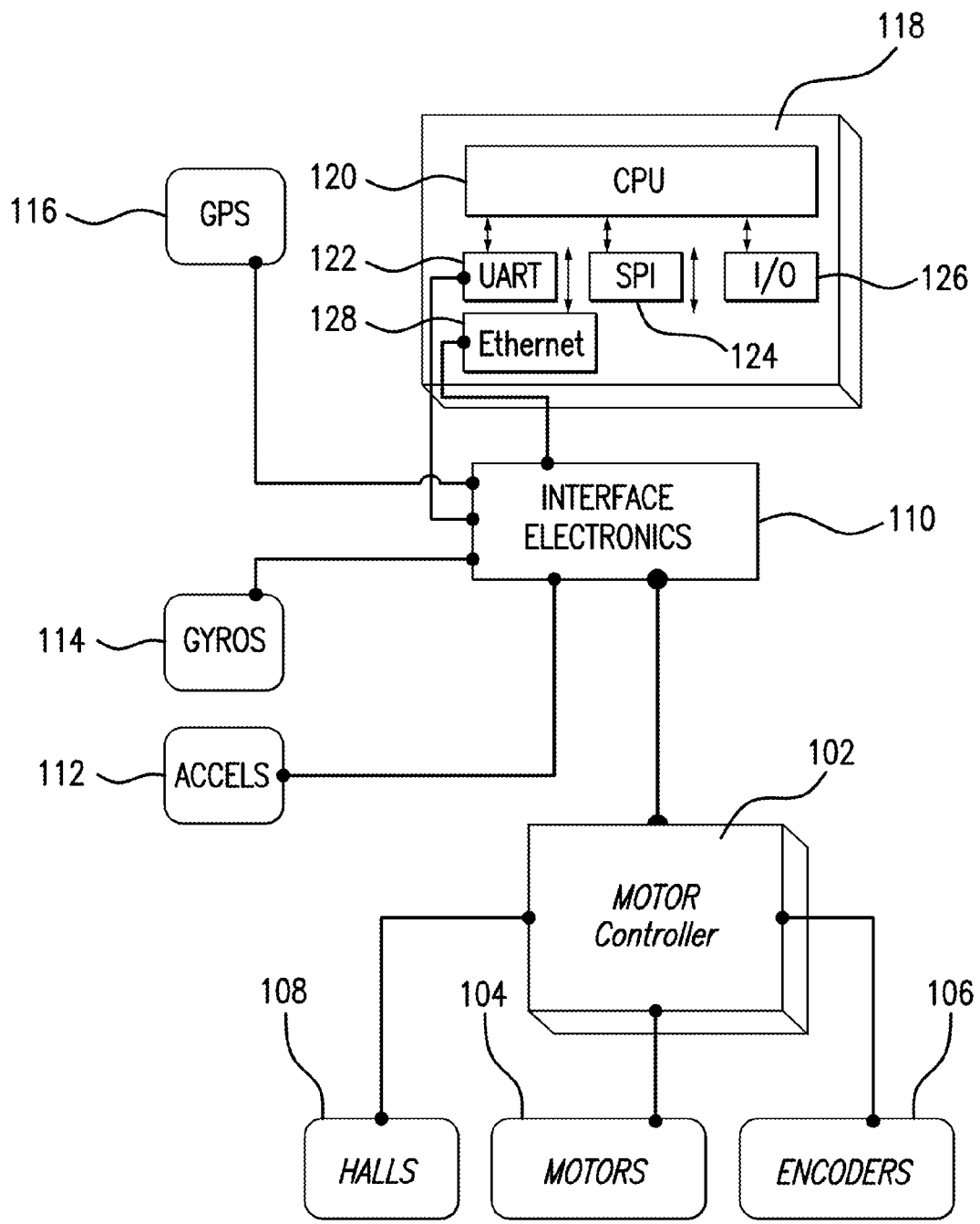
FIG. 1 shows a conventional microprocessor based motor control system in accordance with the prior art.

It is to be appreciated that the below described embodiments are not limited in any way to what is shown in the Figures, and instead, can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the certain illustrated embodiments. Furthermore, the terms and phrases used herein are not intended to be limiting but rather to provide an understandable description of the certain illustrated embodiments.

Unless defined otherwise, all technical and scientific terms used herein have the same meaning as commonly understood by one of ordinary skill in the art to relating to below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a," "an," and "the" include plural referents unless the context clearly dictates otherwise. Thus, for example, reference to "a stimulus" includes a plurality of such stimuli (and equivalents known to those skilled in the art) and reference to "the signal" includes reference to one or more signals (and equivalents thereof known to those skilled in the art), and so forth.

It is to be appreciated the certain embodiments described herein are preferably utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, for download from a remote machine, etc.

As used herein, the term "mobile platform" may refer to any vehicle with or without an on-board human pilot. For example, mobile platform may include, but are not limited to, Unmanned Aerial Vehicles (UAVs), fixed-wing UAVs, rovers, walking robots, hovercraft, submersibles, and surface vehicles. The term "mobile platform" is also intended to refer to any portable electronic device such as a cellular telephone, smart phone, tablet computer, or other wireless communication device. Any operable combination of the above are also considered a "mobile platform."

The term "device" is used herein in a broad sense and includes any type of sensor, including any type of camera and other kinds of image capture devices. A sensor may capture information in a series of two or three dimensional arrays. The sensor may include both active and passive sensors.

As used herein, the term "processing device" is to be broadly construed to include any type of embedded processor.

System on Chip (SOC) is now a commonly used concept; the basic approach is to integrate more and more functionality into a given device. SOC technology uses the increased capacity of modern integrated circuits to create separate functional elements, or Intellectual Property (IP) blocks, on the same semiconductor chip. The separate IP blocks are connected and interconnected to satisfy the designer's system-level requirements. Each IP block can be quite complex and can do substantial amounts of work both with and without predetermined cycle by cycle interaction off the SOC. The IP blocks can also simultaneously run several different software programs, some of which may interact with other IP blocks on the SOC, as well as with devices off the SOC. This integration can take the form of either hardware or solution software. Performance gains are traditionally achieved by increased clock rates and more advanced process nodes. Many SOC designs pair a microprocessor core, or multiple cores, with various peripheral devices and memory circuits.

A SOC described herein is an extension of a modern typical SOC implementation containing a modern multi-core processor and utilizing a commodity operating system. Various embodiments of the present invention utilize a set of co-processing elements (IP blocks) that are instantiated in the SOC. SOC described herein can be utilized in any embedded control system and/or any embedded parallel processing system. Embodiments of the present invention described below are directed to a system configured to process position information provided by a variety of position sensors in a variety of formats and configured to convert this information into a format understood by a motor controller associated with the position sensors.

Referring now to FIG. 1, there is illustrated a conventional microprocessor based motor control system 100 in accordance with the prior art. The illustrated prior art system includes a typical motor controller 102 in direct communication with a plurality of motors 104. In closed loop systems, one or more motor position sensors (i.e., encoders 106 and hall sensors 108 described in more detail below) collect position, velocity or acceleration information about the plurality of motors 104 and provide that information to the motor controller 102. A closed-loop control system within the motor controller 102 receives the motor position or other information as feedback and improves the accuracy of the positioning or movement characteristics of the motors 104. Motors whose operation is affected by feedback and under closed loop control are often referenced as servomotors.

Motor controller 102 is also in direct communication with a plurality of systems that may be regarded as motor initiators because they signal the need to initiate action from a motor 104. For example, a processing device 118 may provide a signal or user command to the motor controller 102 through the interface electronics 110 to initiate operation of one or more of the motors 104. Based on the particular motor 104 being controlled, closed-loop control may be used by the motor controller 102 to control and adjust the speed and torque of a motor 104 as needed. It is well known, the motor controllers 102, in addition to controlling various operating parameters of the motor 104, incorporate other functionality, such as, but not limited to, an electromagnetic interference (EMI) filter circuit. For example, the filter circuit may suppress EMI within the motor controller system 100. EMI is defined generally as any undesirable electromagnetic emission or any electrical electronic disturbance, man-made or neutral, which causes an undesirable response, malfunctioning or degradation in the performance of electrical equipment.

Processing device 118 illustrated in FIG. 1 may be configured to control a software-defined inertial navigation system (INS). Thus, processing device 118 is also in direct communication with a plurality of devices configured to collect inertial data, such as accelerometers 112, gyroscopes 114, magnetometers (not shown), barometers (not shown), and GPS devices 116 via electronic interface 110. In various embodiments, interface electronics 110 may comprise a bit level interface, RS232 interface and the like.

Processing device 118 includes a Central Processing Unit (CPU) 120, Ethernet Controller 128 and a plurality of interfaces, such as a universal asynchronous receiver/transmitter (UART) 122, SPI 124 and I/O 126 integrated on the same chip. The UART 122 typically includes a number of registers, and is connected to at least one external device, such as a motor controller 102 or an accelerometer 112 through interface electronics 110. The input received from the external device is stored in the number of registers of UART 122. At least one external device, such as GPS device 116, may be connected to SPI interface 124. Processing device 118 may employ I/O interface 126 for communication with one or more external memory components (not shown in FIG. 1). In addition, an Ethernet controller 128 provides control functions for additional network devices (not shown in FIG. 1) connected to an Ethernet port of processing device 118.

Figure 2A:
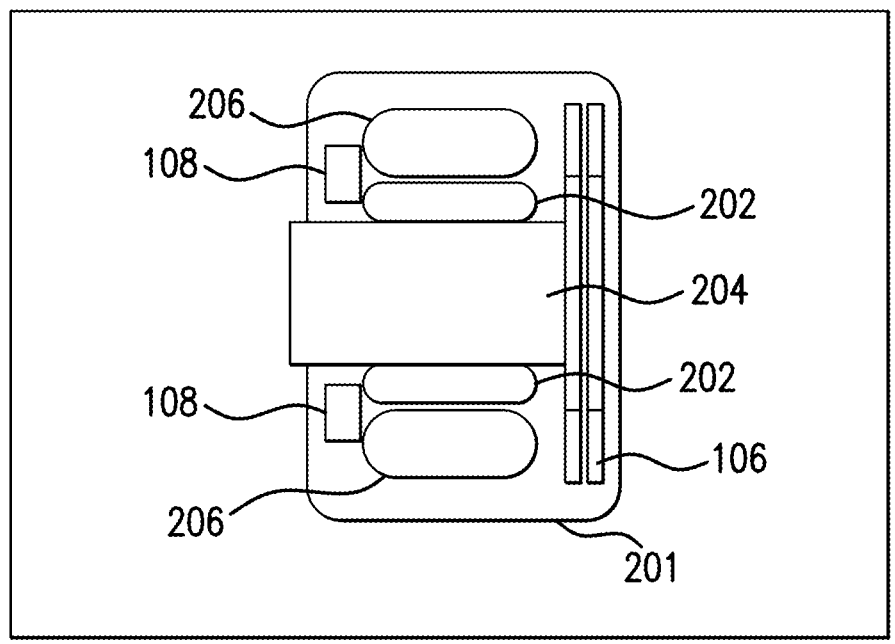
FIGS. 2A and 2B schematically show cross sectional views of conventional rotating motors.

FIG. 2A shows a cross sectional view of a conventional rotating motor structure. An outer casing includes a motor casing 201. A motor stator 206 having winding coils thereon is fixed inside the motor casing 201. In the motor casing 201, furthermore, a pair of bearings (not shown) is mounted. The pair of the bearings rotatably supports a motor shaft 204 serving as a rotating shaft.

A motor rotor 202 is mounted on the motor shaft 204. In the motor rotor 202, a permanent magnet is fixedly contained.

As previously noted, motors are often fitted with sensors that detect the position, velocity or acceleration of the motor 104. In most applications, only the motor position need be sensed as a function of time and other desired motor positioning characteristics can be derived from the relationship between the motor position and time. Two types of motor position sensors, encoders and resolvers, are prevalent in motors. Encoders provide the motor with an indicator of motor position. FIG. 2A illustrates an encoder 106 mounted to the motor casing 201 so that the indicator changes positions as the rotor 202 and shaft 204 change position.

Encoders have been popularly used as displacement sensors in various servo systems. Encoders generally detect rotation of motors, linear motion, and position, angle, velocity, and other displacement of a body in rotary motion. Encoders generally detect displacement information either magnetically or optically. Optical encoders typically have a housing that houses a light source and a light receiving section which receives light from the light source, and an optical scale (i.e. a code disk) connected to the rotating body, such as shaft 204, as a moving object. For example, an optical rotary encoder that detects rotation of a rotor 202 has a rotary disk (a code disk) connected to the shaft 204. On the code disk, slit-form light transmitting section and light shielding section are periodically arranged. Optical encoders are generally of two different types: incremental and absolute position. Incremental-type encoders are the simpler of the two and are either of the reflective or transmissive type. The difference between the absolute and incremental encoders is that the incremental encoders measure relative travel distances and absolute encoders allow for absolute position length-measurement. In the case of optical encoders, the incremental encoders have incremental tracks with incremental patterns including equally spaced light and dark regions. Based on these patterns, the incremental encoders count light and dark signals to detect relative travel distances. In addition, the incremental encoders may detect absolute travel distances by detecting origin detection patterns provided separately from the above-mentioned incremental patterns with equally spaced light and dark regions, and then detecting relative travel distances from the origin. On the other hand, the absolute encoders have absolute tracks with absolute patterns representing pseudo-random codes and detect absolute positions resulting from reading the absolute patterns for a corresponding object. Unlike the incremental encoders, the absolute encoders do not require any origin detection based on origin detection patterns and may start measurement at a current position when powered on.

It is noted that in some motors resolvers can be used instead of encoders 106. Resolvers represent a different strategy for measuring the position and other movement characteristics of motors. Resolvers can be viewed as rotary transformers and generally have structures similar to motors. That is, resolvers include a rotating or otherwise moving rotor and a stationary stator. One or more coils are generally provided on the rotor and the stator, although other configurations are known. The resolver rotor is attached to a shaft 204 and generally one or more of the windings of the stator or rotor are driven with an alternating signal. Signals from the undriven coils are extracted and processed to yield position or velocity information about the shaft 204 to which the rotor is coupled. As a general matter, resolvers are added to motors as distinct structures and so are not integrated with the electronics or magnetics of the motor. Resolvers typically output analog signals, while most encoders typically output digital signals. For example, incremental encoders usually generate continuous digital signals and absolute encoders can generate digital serial signals. Incremental encoders typically generate quadrature signals.

As shown in FIG. 2A, a conventional rotating motor structure may further include a hall sensor 108 disposed at stator 206. A hall sensor 108 may be a magnetic sensor the output of which is varied according to an applied magnetic field. A magnetic field applied to the hall sensor 108 may be varied according to rotation of a magnetic pole for location detection disposed at the rotor 202. The rotating angle and speed of the rotor 202 may be measured by measuring an output signal of the hall sensor 108 disposed at the stator 206. The hall sensor 108 may be disposed at the stator 206 with a predetermined interval, and may generate a multiplied pulse signal. It is noted that hall sensors 108 are optional in advanced high performance motors.

If the permanent magnets are attached to the rotor 202, commutating mechanisms, usually electronic (brushless), are required to switch the current in the stationary fields to maintain the stationary magnetic fields in a fixed spatial orientation relative to the rotating magnetic fields produced by the permanent magnets on the rotor 202. The fixed spatial relationship between the rotating and fixed magnetic fields is required to produce torque on the rotor 202.

It is noted that some high performance motors may achieve virtually flat torque by utilizing angular position characteristics provided by the position sensors such as encoders 106 and hall sensors 108. Brushless motors implement different commutation techniques as compared to brushed motors. Commutation refers to the action of selectably delivering power (e.g., described in terms of currents or voltages) to energize coils at proper motor phases to produce torque. Brushless motors operate by electronically commutating phase currents passing through stationary windings of the stator 206 to magnetically interact with permanent magnets on the rotor 202. In brushless motors, an external electronic driver, such as motor controller 102, switches the application of currents to the stator windings. These currents then produce magnetic fields to generate torque on the permanent magnets.

It is well known, the motor controllers 102 incorporate feedback signals that provide the precise location of the rotor with respect to the stator at any given time. As previously indicated, in conventional systems, this position information is provided using Hall Effect sensors, optical encoders, or synchro resolvers. Signals from these external sensors are fed back to the motor controller 102, which switches stator windings on and off (thereby moving the induced magnetic field) based on the position of the rotor via digital commutation signals. Thus, generation of commutation signals typically keeps conventional motor controllers 102 busy for substantial periods of time. As a result, such conventional motor controllers tend to be very slow with respect to responding to outside commands and queries.

It is noted that conventional motor controllers 102 perform torque calculations based on the position data fed back from the encoders 106. Thus, in order to perform torque calculations motor controllers 102 typically need accurate encoder information to be delivered very quickly. Furthermore, in a conventional motor control system depicted in FIG. 1, current mode of communication between two interrupt driven processors 102, 120 is not very efficient. Thus, latency of the motor controller affects accuracy of the positional information in motor-based position system, especially multi-axis position systems.

Figure 2B:
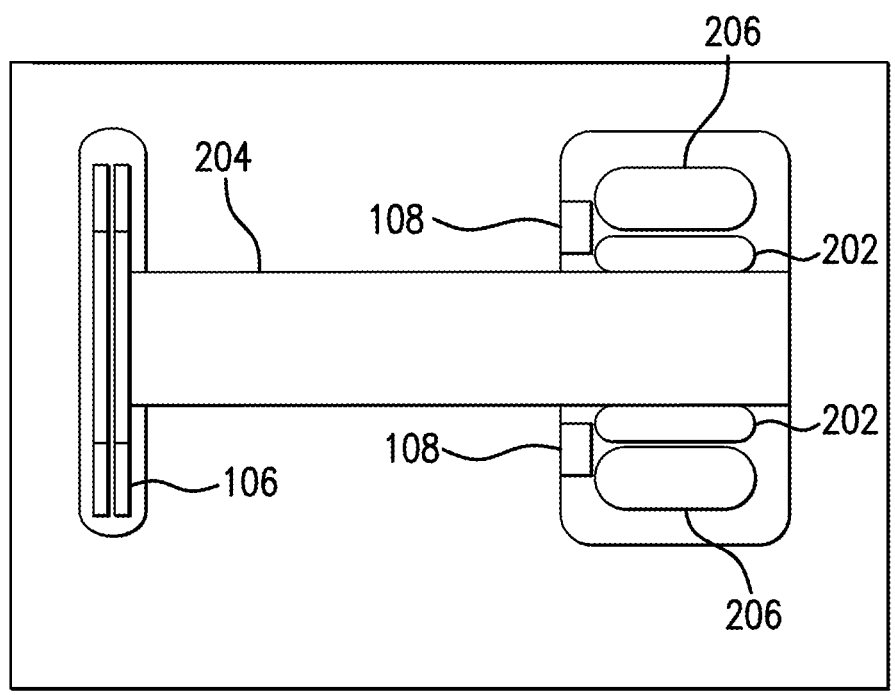

FIG. 2B shows a cross sectional view of an alternative conventional rotating motor structure 104. In this case the encoder 106 is mounted to the protruding end of the shaft 204.

Figure 3:
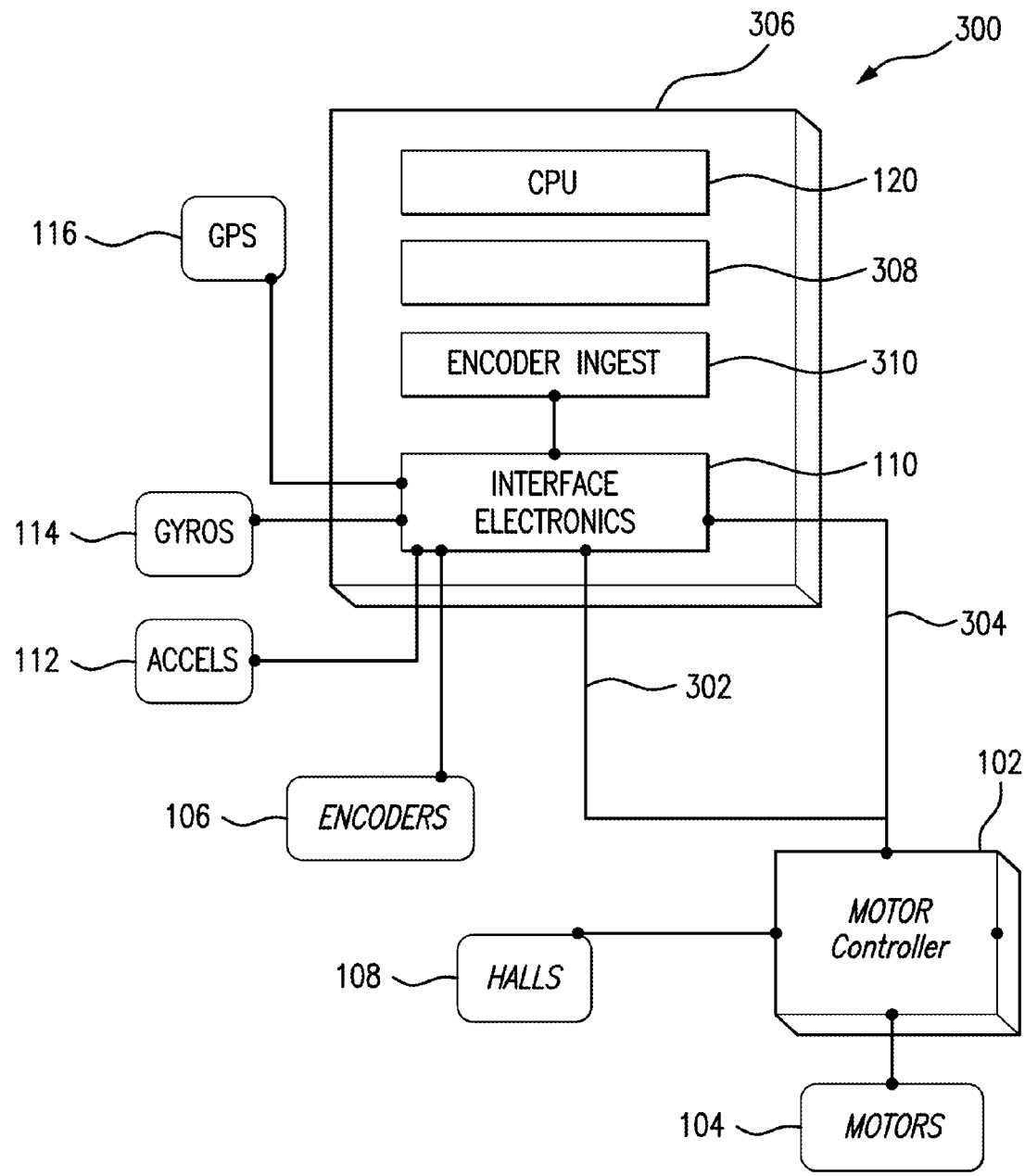
FIG. 3 shows a microprocessor based motor control system in accordance with an embodiment of the present invention.

FIG. 3 shows a microprocessor based motor control system in accordance with an embodiment of the present invention. The motor control system shown in FIG. 3 differs from the motor control system shown in FIG. 1 in that encoders 106 are connected directly to the interface electronics 110, such as SPI interfaces 502 (shown in FIG. 5), instantiated in the processing device 306. In an embodiment of the present invention, motor controller 102 comprises a servo motor controller. The servo motor controllers are commercially available and may be sold in a prepackaged system. In several embodiments, the processing device shown in FIG. 3 is implemented using programmable logic components (e.g. field programmable gate array (FPGA), complex programmable logic device (CPLD) or the like). In another embodiment, processing device 306 is implemented using any number of discrete logic components. In yet another embodiment, processing device 306 is implemented using an application specific integrated circuit (ASIC). In one embodiment, processing device 306 comprises SOC utilizing a set of co-processing elements (IP blocks) 308, 310 that are instantiated in the SOC 306.

According to an embodiment of the present embodiment, one of the IP blocks, referred to hereinafter as encoder ingest IP block 310, is configured to exchange data related to the operation of the plurality of motors 104 (such as commutation commands 304) with the motor controller 102. Advantageously, in one embodiment, encoder ingest IP block 310 is configured to receive signals indicative of absolute positions of the plurality of motors 104 from the one or more encoders 106, further configured to convert the received encoder signals into a format understood by the motor controller 102 and send the converted signals to the motor controller 102. In an embodiment of the present invention, the format understood by the motor controller 102 comprises quadrature signals.

Encoder ingest IP block 310 generates quadrature signals corresponding to rotation of the rotor 202 of a particular motor 104 in a clockwise or a counter clockwise direction. Decoding of the quadrature signals is generally achieved through a set of instructions in the motor controller 102. For example, based on whether the rotor 202 of a motor 104 has moved clockwise or counter clockwise, the motor controller 102 chooses a specific action. The specific action may include actions, such as increasing speed of the motor 104, decreasing torque of the motor 104, etc. According to an embodiment of the present invention, encoder ingest IP block 310 runs at about 100 MHz and generates quadrature signals with a minimal delay, such as being below about 0.01 microseconds. The motor controller 102 merely treats this latency as a mechanical latency.

The encoders 106 shown in FIG. 3 may comprise any type of encoders including, but not limited to, absolute encoders, incremental encoders, resolvers and the like. It is noted that in illustrative embodiment the encoder ingest IP block 310 receives signals from an absolute encoder and converts the encoder signals into quadrature incremental encoder signals sent via a direct connection to the motor controller 102, while in other embodiments the encoder ingest IP block 310 may generate signals in a different format understood by the motor controller 102.

The motor controller system 300 illustrated in FIG. 3 provides improved performance due to encoder signals being sent directly to the processing device 306, thusly eliminating the inefficiency and latency of the motor controller 102 with respect to processing positional information provided by the encoders 106 and/or hall sensors 108. Furthermore, the illustrated architecture enables the motor controller 102 to operate the one or more motors in a substantially constant torque mode, thusly improving motor controller's 102 efficiency.

It is noted that the processing device 306 illustrated in FIG. 3, in addition to the encoder ingest IP block 310, may further include a main processor in the form of CPU 120 and one or more additional co-processing components 308 implemented as discrete programmable logic components (e.g. FPGA, CPLD, ASIC or the like).

Figure 4:
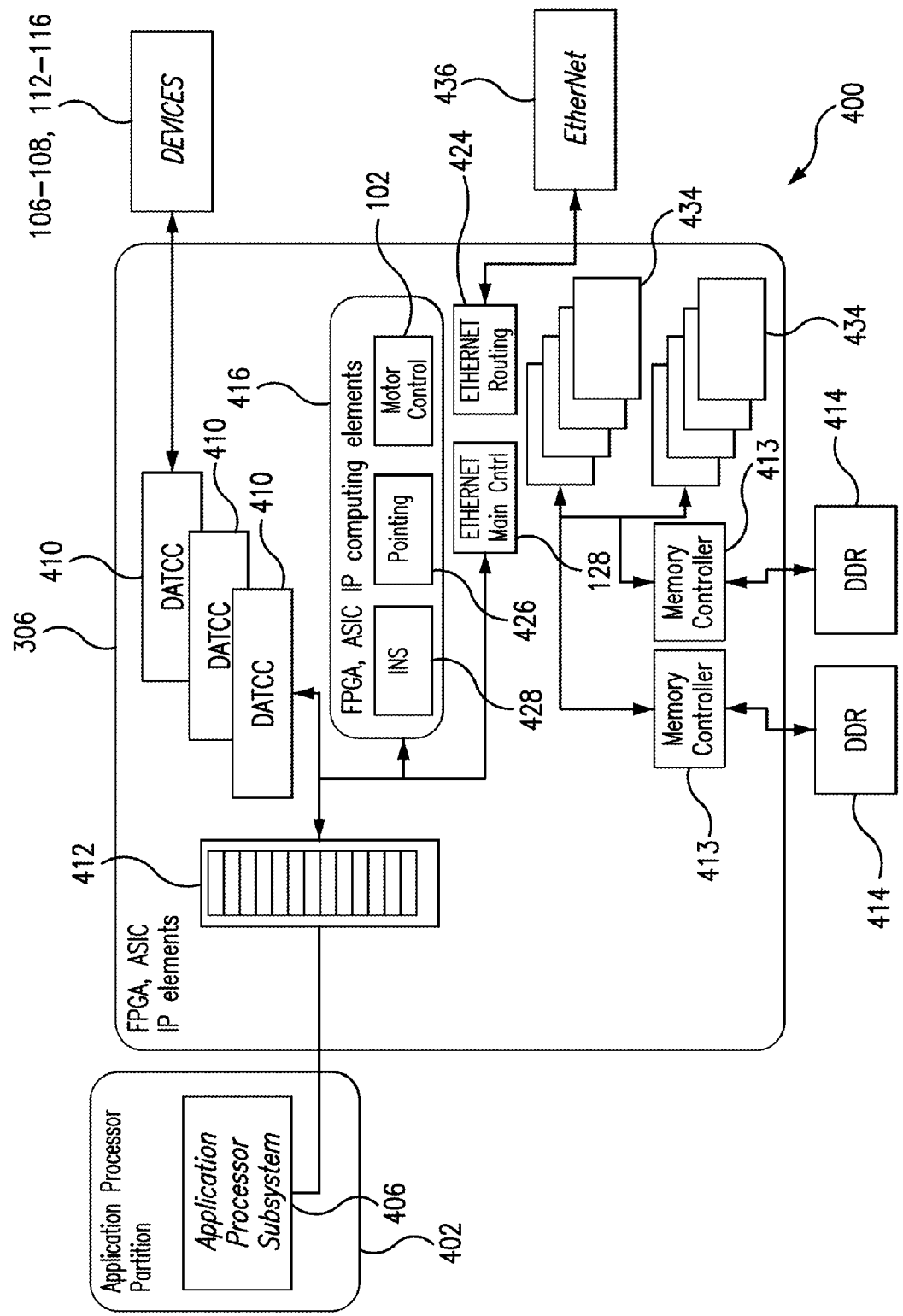
FIG. 4 is a system diagram illustrating a processing architecture of a motor-based position system which includes a motor control system in accordance with an embodiment of the present invention.

FIG. 4 is a system diagram illustrating a processing architecture of a motor-based position system 400 which includes a motor control system in accordance with an embodiment of the present invention. In one illustrative embodiment, the motor-based position system 400 comprises a machine vision system. While the embodiment described below is directed to a machine vision system attached to a mobile platform, this embodiment is also applicable to various kinds of parallel-processing systems.

Typical machine vision systems include pluralities of computing elements, operating systems, physical sensors (i.e., image forming sensors), application software and actuation controllers. In a nutshell, a machine vision system works by querying the physical sensors at defined intervals, decoding the sensor feedback, estimating where in space the system is and where it is pointing, synchronizing the capture of the image forming data and collecting all of this information in digital memory. Typically, one or more application components perform each step of this data collection. Then the application software typically runs complex routines that take the image and physical sensor data to create an output. Additionally, the active control elements of a vision system mounted on a mobile platform typically need to react to real world disturbances as detected by the wide modality of sensors.

The machine vision system 400 illustrated in FIG. 4 includes an application processor logical partition 402 having a computing device's application processor(s) 406 and a SOC 306 having one or more customized co-processors and a plurality of devices 106-108 and 112-116 attached to the SOC 306. Logical partitioning divides hardware resources so that specific cores, memory areas and I/O ports are allocated to the different partitions. The multi-core processor system 400 may run application codes in the same operating system (OS) and may be scheduled to run a code in parallel, symmetrical multi-processing mode (SMP). In the architecture illustrated in FIG. 4 application processor subsystem 406 is primarily responsible for executing one or more applications.

It is noted that the plurality of devices 106-108 and 112-116 (i.e., position sensors and inertial data sensors) collect variety of data related to the mobile platform. In one embodiment, the position, velocity, and angular orientation of the mobile platform may collectively be referred to as state vectors. According to an embodiment of the present invention, the state vectors are stored in a read-write memory 412 having a plurality of addressable memory locations. In one implementation, state vector memory 412 is instantiated on SOC 306. State vector memory 412 implemented as multi port random access memory ("RAM") enables concurrent processing of a number of data channels. Advantageously, in some embodiments, SOC 306 further includes state management logic to perform state vector management operations for the acquired state vector data. According to an embodiment of the present invention, the state management logic coordinates sharing and updating the acquired state vector data in a concurrent fashion between application processor subsystem 406 and one or more co-processors described below. For example, if the state management logic uses separate read and write ports to access state vector memory 412, then a triple-port RAM may be used instead of a dual-port RAM, with the third port being reserved for control access by the state management logic.

In accordance with an embodiment of the present invention, the SOC 306 also includes a customized DATa Collection and Control (DATCC) co-processor 410 designed to off-load data movement tasks and interrupt handling tasks from the application processor 406. In one embodiment, DATCC co-processor 410 executes specific microcode instructions contained in a particular DATCC program. While only three DATCC co-processor components 410 are shown in FIG. 4 for ease of illustration, alternative embodiments are contemplated in which any number and combination of DATCC co-processors 410 can be utilized. This number is of course limited by the size and layout of the SOC 306 used in machine vision processing system 400. For example, such machine vision processing system 400 may include more than 10 DATCC co-processors 410 instantiated on a single chip.

In accordance with an embodiment of the present invention, the plurality of devices 106-108, 112-116 may be connected to the SOC 306, via a plurality of interfaces. In various embodiments, the devices 106-108, 112-116 may provide and receive digital communication, provide and receive serial communication, provide analog input that needs to be converted to digital format, receive analog output that has been converted from digital format, provide temperature readings, and the like. In one exemplary embodiment, the plurality of interfaces may include a bit level interface, standard peripheral interface and enhanced peripheral interface.

Examples of well-known in the art standard peripheral interfaces may include, but are not limited to, IEEE 1394, also referred to as FireWire, Universal Serial Bus, commonly referred to as USB, and the like.

At least some of the devices 106-108, 112-116 may utilize an enhanced peripheral interface. This type of serial communication is typically high speed, low power and may be converted to the device specific interface at a particular device 106-108, 112-116. Enhanced peripheral interfaces typically allow minimizing pin count and power consumption.

Still referring to FIG. 4, it is noted that the size of the positional and inertial input data ingested by several complex DATCC co-processors 410 precludes the use of the state vector multiport memory 412 for long term storage due to technical limitations. According to an embodiment of the present invention, to preserve the timing information and position data alignment, DATCC co-processors 410 may utilize a multi-bank double data rate (DDR) dynamic random access memory (DRAM) 414. Various embodiments of the present invention utilize separate DDR banks 414. Furthermore, DATCC co-processors 410 may utilize on chip memory elements, such as memory controllers 413 that enable complex mathematical manipulation of this large size ingested data in a power efficient, deterministic manner. In an embodiment of the present invention, memory controllers 413 are configured to schedule access to a variety of DDR banks 414. This type of arrangement allows DATCC co-processor(s) 410 to stream data to DDR banks 414 substantially without any involvement of application processor 406. As previously noted, DATCC co-processors 410 also have access to the state vector memory 412. DATCC co-processors 410 offload data capture and movement tasks from application processor 406, thus relieving application processor's 406 workload and bandwidth.

Furthermore, the SOC 306 may further include embedded Ethernet traffic offload engine consisting of a routing element 424 and memory interface element (i.e., Ethernet controller 128). In the illustrated embodiment, Ethernet controller 128 is preferably configured to process requests from application processor 406 and/or other co-processing components related to moving data from DDR memory 414 throughout the Ethernet 436. In one embodiment, Ethernet router 424 instantiates SOC's 306 MAC address in hardware which enables SOC 306 to send high volume state vector data to the Ethernet connection 436 without any involvement of application processor 406. It is noted that the depicted Ethernet traffic offload engine appears to application processor 406 and any external application as a standard pass through Ethernet socket.

Still referring to FIG. 4, SOC 306 may further include one or more co-processing components 416 configured to offload computational tasks from the application processor 406. In one embodiment the one or more co-processing components may include but are not limited to a motor controller 102, pointing co-processing component 426 and INS component 428.

The purpose of an INS component 428 is to compute and provide a navigation solution to a machine vision mobile platform on which it is installed. A navigation solution consists of the Position, Velocity and Attitude (PVA) of the INS with respect to the Earth. INS component 428 computes a navigation solution based on the dead-reckoning principle: given the initial position, velocity and altitude of the mobile platform (referred to as "initial conditions"), continuous readings from the devices (i.e., inertial sensors) 112-116 of the platform are used to keep an updated navigation solution even and particularly when the platform is in a dynamical state. As shown in FIG. 4, INS component 428 preferably is directly coupled to state vector memory 412 and may utilize the state vector memory 412 as an input and output buffer interface.

In accordance with an embodiment of the present invention, the motor controller 102 is disposed on SOC 306 and in communication with the plurality of devices 106-108 and 112-116 and the state vector memory 412. The motor controller 102 described above in conjunction with FIGS. 1-3 may ingest very accurate motor state data directly into the state vector memory 412. Motor controller 102 may also be configured to route motor signaling to a plurality of motors via either direct or rapid bitmapping and/or via a serialization stream. Advantageously, various embodiments of the present invention contemplate that the plurality of DATCC co-processors 410 preferably ingest the positional sensor data directly, convert the ingested data into an appropriate format understood by the motor controller 102, calculate velocity, acceleration and altitude of the mobile platform and stores the calculated data in the state vector memory 412. In addition, substantially simultaneously, DATCC co-processors 410 may retransmit the converted sensor data to the motor controller 102. The system illustrated in FIG. 4 affords a substantial improvement in operation if it includes multiple motor controllers 102, wherein each motor controller 102 is connected to a plurality of motors, as compared to other multi controller systems known in the art.

In one embodiment, pointing co-processing component 426 may be configured to calculate point trajectories utilized by the motor controller 102. Point trajectories are needed whenever positioning data builds on long term motion analysis. It is noted that, just like motor controller 102, pointing co-processing component 426 utilizes state vector memory 412 for storing the generated data.

Furthermore, as shown in FIG. 4, the SOC 306 includes a plurality of embedded hardware processing units 434 configured to concurrently perform computation intensive functions that depend on values stored in state vector memory 412. In various embodiments, the hardware processing units 434 may be implemented as an array of discrete programmable logic components (e.g. FPGA, CPLD, ASIC or the like). The hardware processing units 434 are part of a complete modular processing architecture.

Figure 6:
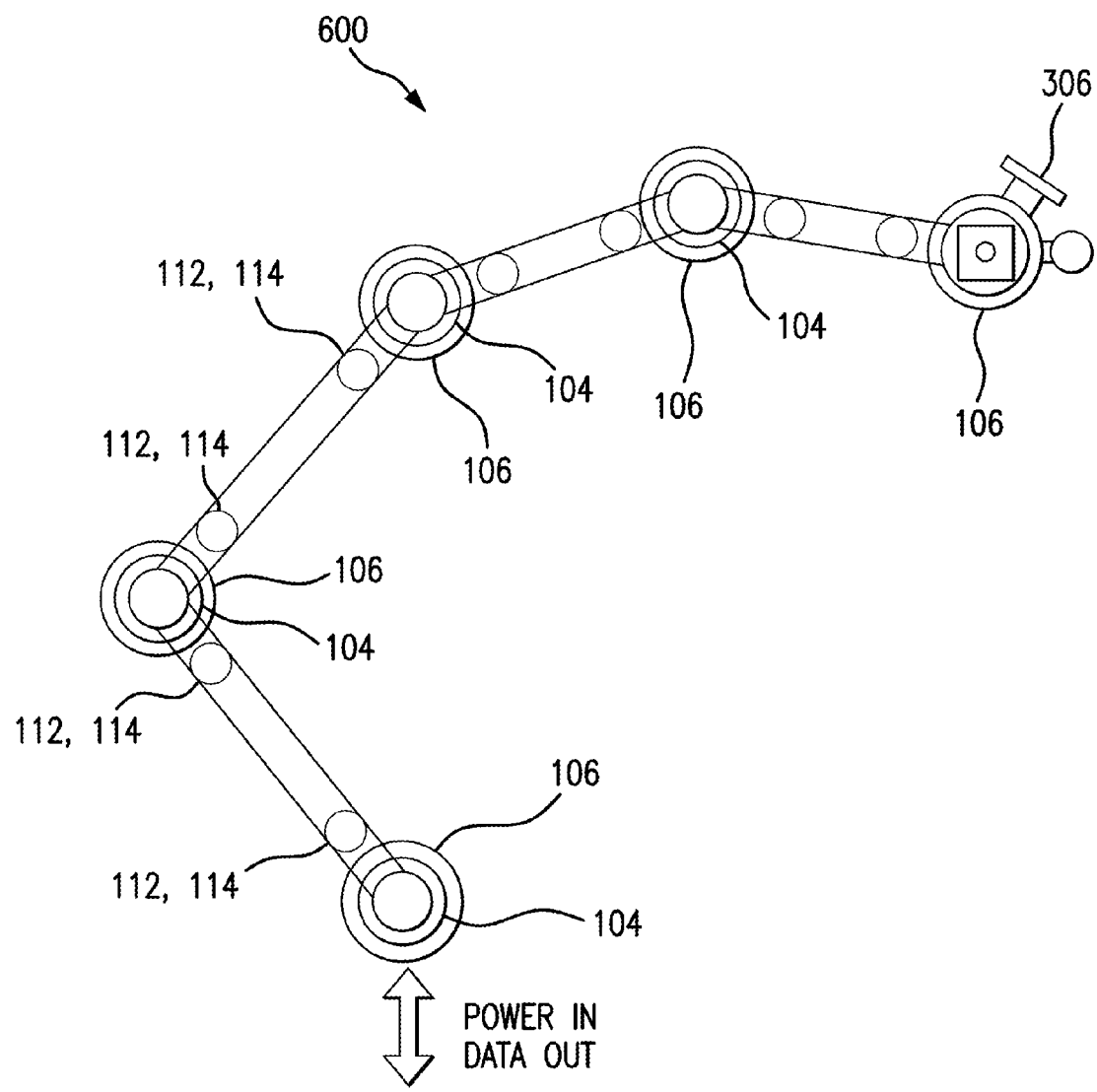
FIG. 6 illustrates a schematic view of a multi-axis robot apparatus including a multi-axis motor drive assembly according to an embodiment of the present invention.

Referring now to FIG. 6, there is illustrated a perspective view of a multi-axis robot apparatus including a multi-axis motor drive assembly according to an embodiment of the present invention. In one embodiment, the multi-axis robot apparatus illustrated in FIG. 6 comprises a robotic arm 600. The illustrated robotic arm 600 includes a plurality of motors 104 and is capable of flexing. Associated with each motor 104 are a position encoder 106 and one or more inertial sensors 112,114 so that the position of the motor (and, derivatively, the position of the arm 600) is known. As shown in FIG. 6 the exemplary apparatus further includes an assembly control system disposed on SOC 306. To accurately calculate the position of the robotic arm 600 in 3D space the control system combines position data provided by the encoders 106 at each joint and flex data indicative of the arm's flex at each joint based on the inertial sensor's 112,114 data. In one embodiment, the encoders 106 utilized in the multi-axis robotic arm 600 comprise absolute encoders.

Figure 5:
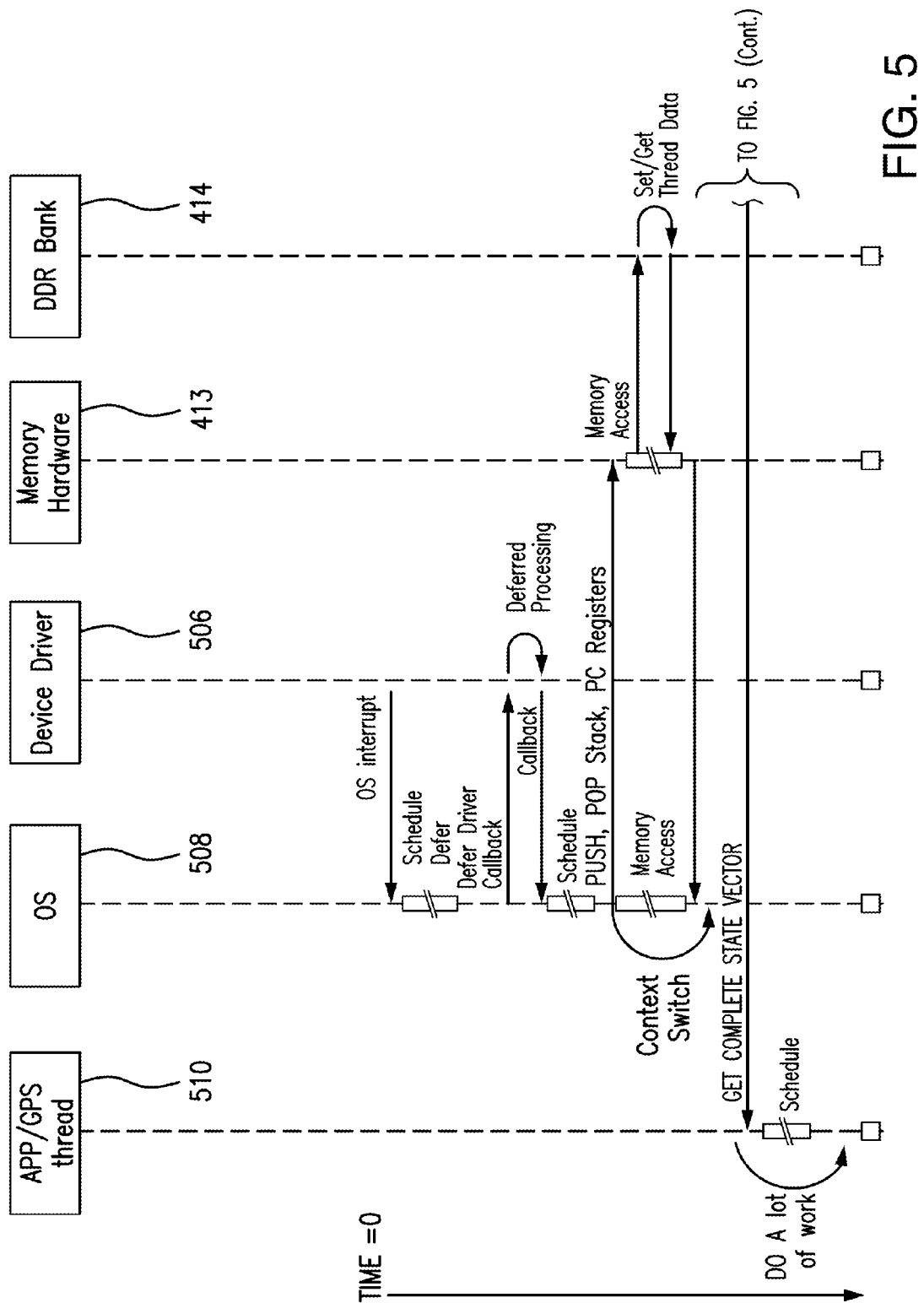
FIG. 5 is a sequence diagram view illustrating a method of processing encoder signals and inertial data to generate more accurate positional information by a multi-axis motor control system in accordance with an embodiment of the present invention.
Figure 5:
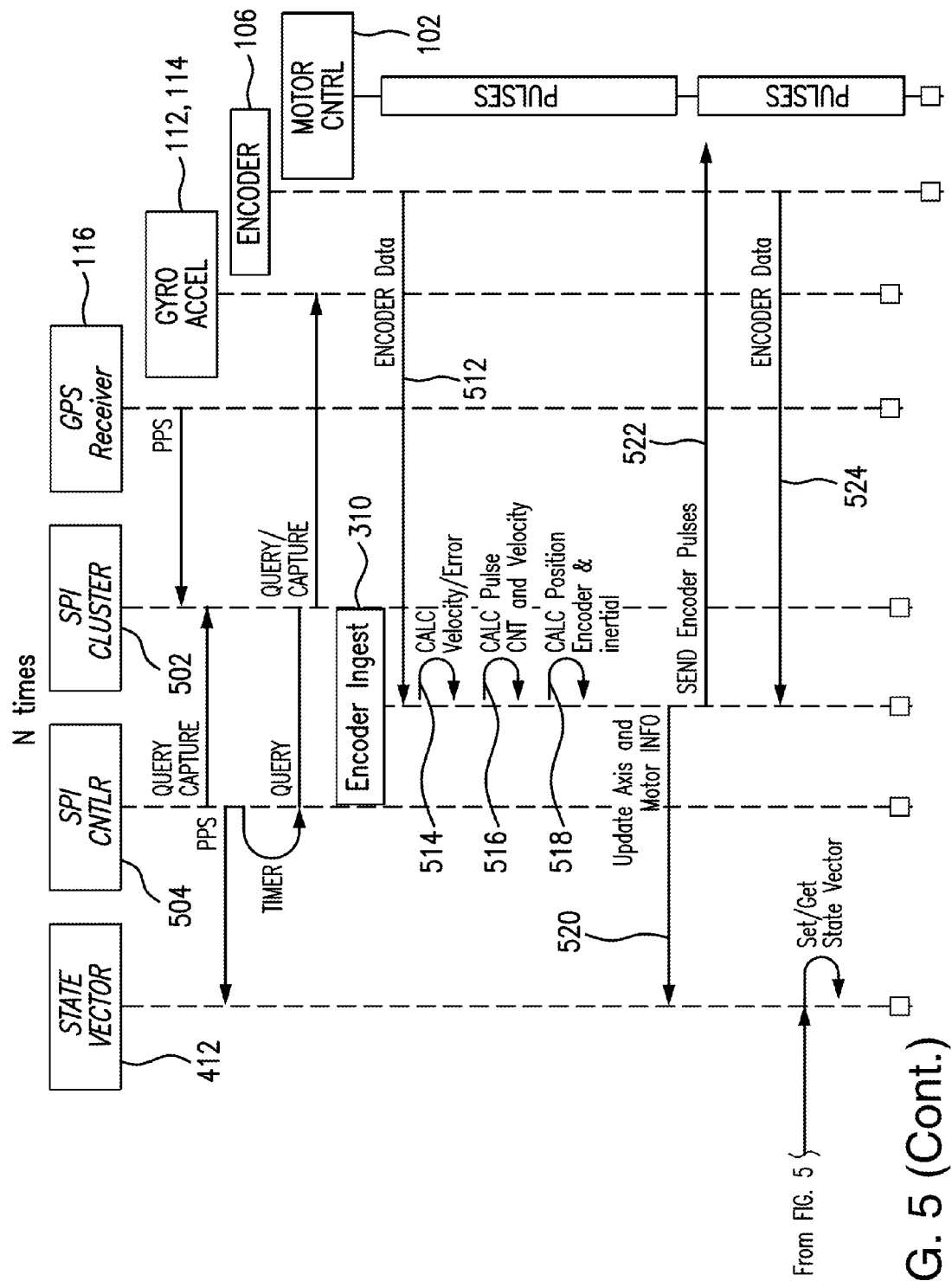

Referring now to FIG. 5, there is illustrated a sequence diagram view illustrating a method of processing encoder signals and inertial data to generate more accurate positional information by a multi-axis motor control system in accordance with an embodiment of the present invention. FIG. 5 illustrates communication between the plurality of devices 102-116, various interfaces and co-processing elements, such as SPI cluster 502 and SPI controller 504 and encoder ingest IP block 310 that are instantiated in the SOC 306, and various memory elements including state vector memory 412, memory controller 413, DDR memory bank 414, and the like. FIG. 5 further illustrates a procedure for handling interrupts in the execution of a multitasking operating system. For example, FIG. 5 illustrates the handling of received interrupts by a device driver 506, operating system 508 and an application process 510. Functionality of SPI management system, which may include SPI cluster 502 and SPI controller 504, is further described in co-pending application Ser. No. 14/461,086 incorporated by reference herein.

As shown in FIG. 5, the plurality of encoders 106, such as absolute encoders, periodically send encoder data at steps 512, 524 to encoder ingest IP block 310. At step 514, the encoder ingest IP block 310 calculates a relative velocity of the encoder 106 to check whether an error has occurred based on the received encoder information. In an embodiment of the present invention, encoder ingest IP block 310 calculates the encoder velocity based on a previous position reading and the time elapsed since the previous reading. In another embodiment, the relative velocity could be determined from at least two previous readings. Furthermore, an error detection code of the encoder ingest IP block 310 may utilize one or more previous position readings, among other things, to identify and correct encoder position errors.

According to an embodiment of the present invention, various types of encoders 106 may provide data in steps 512, 524. For example, a high accuracy absolute encoder may provide absolute position information with 18 bits of resolution while other encoders 106 may have lower resolutions. At step 516, the encoder ingest IP block 310 performs a conversion to account for differences in various encoding schemes. For example, in an embodiment of the present invention, at step 516 the encoder ingest IP block 310 may scale the counts provided by different types of encoders to calculate the number of pulses needed to be generated in the output signal.

Next, at step 518, the encoder ingest IP block 310 calculates more accurate motor and/or axis position information based on the position information provided by the plurality of encoders 106 and based on the inertial data provided by one or more inertial sensors 112-116. It is noted that if the motor control system comprises a multi-axis motor control system, such as the multi-axis robot apparatus 600 illustrated in FIG. 6, the encoder ingest IP block 310 calculates the position information for each axis of the system. In one embodiment, determining a more accurate position information may include the encoder ingest IP block 310 applying a Kalman filter to the position data from the encoders 106. It should also be understood that, while a Kalman filter is one useful technique for converting encoder data into positional information understood by the motor controller 102, other filters or linear modeling techniques may similarly be applied. According to an embodiment of the present invention, at step 520, the encoder ingest block 310 stores the calculated motor and/or axis position information in the state vector memory 412, as shown in FIG. 5.

Advantageously, in an embodiment of the present invention, at step 522, the encoder ingest IP block 310 generates position information in a format understood by the motor controller 102 based on the position information calculated at step 518. In an embodiment, the encoder ingest IP block 310 generates a pair of quadrature signals. In other words, the encoder ingest IP block 310 produces a pair of square waves typically noted as "A" and "B" channels, representing motor movement. For example, the encoder ingest IP block 310 may show a 90° phase difference between the A and B channels from which the motor direction can be inferred. It is noted that step 522 further contemplates the encoder ingest block IP 310 sending the generated signals to the motor controller 102. It is further noted that some motor controllers 102 may not be configured to perform commutation calculations based on the received quadrature signals. Thus, in some embodiments, at step 522, the encoder ingest IP block 310 may further convert the generated quadrature signals into commutation signals and may send these signals to the motor controller 102. In an embodiment of the present invention steps 514-518 described above are performed for a plurality of motors substantially concurrently by a plurality of the hardware processing units instantiated on the processing device, such as hardware processing units 434 illustrated in FIG. 4.

While various embodiments described above are directed to a machine vision system attached to a mobile platform and to a multi-axis motor drive assembly, these embodiments are also applicable to various kinds of multi-processor parallel-processing systems. The architectural design disclosed herein is modular and parametric allowing rapid re-scaling. Advantageously, in an embodiment, the positional data processing hardware is capable of operating without any additional load on application processor. This novel feature is particularly useful for substantially providing the consistency of access to the motor control data with consistent timing of data capture and calculation.

According to an aspect of the present invention, when coordinating synchronized data acquisition from the encoders 106 and the plurality of inertial sensors, the control system disposed on SOC 306 can operate in the estimated real position coordinate system, while the motor controller 102 can operate in a direct quadrature coordinate system relating to a rotor of the corresponding electric motor 104. In an embodiment of the present invention, the control system code of the multi-axis motor drive assembly combines both the gyro and/or the accelerometer data channels over sampling, for example, at approximately 10 kHz, and the absolute position information feedback provided by the encoders 106. A typical absolute encoder sample rate may be from about 1000 Hertz (1 KHz) to about 2000 Hertz (2 KHz).

The techniques described herein are exemplary, and should not be construed as implying any particular limitation of the certain illustrated embodiments. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A motor control system, the system comprising:
   one or more motors having a rotor;
   a motor controller for controlling operation of the one or more motors, wherein the motor controller is communicatively coupled to each of the one or more motors;
   one or more encoders configured to detect an absolute position of the one or more motors; and
   a processing device for exchanging data related to the operation of the one or more motors with the motor controller, the processing device includes a state vector memory for storing inertial data and positional information, the state vector memory comprising a plurality of addressable memory locations and a state vector memory management interface communicatively coupled to the state vector memory, the state vector management interface configured to provide read and write control to the state vector memory, wherein the processing device is configured to:
   receive signals indicative of absolute positions of the one or more motors from the one or more encoders;
   convert the received encoder signals into a format understood by the motor controller; and
   send the converted signals to the motor controller.

2. The motor control system of claim 1, wherein the converted signals comprise quadrature signals.

3. The motor control system of claim 2, wherein the converted signals comprise differential pulse signals.

4. The motor control system of claim 2, wherein the conversion of the received encoder signals into the quadrature signals is performed concurrently by a plurality of the hardware processing units instantiated on the processing device.

5. The motor control system of claim 1, wherein the processor is further configured to calculate a relative velocity of the corresponding motor based on one or more previously received encoder signals and based on the time elapsed since the previous encoder signals were received.

6. The motor control system of claim 1, wherein the processor is further configured to detect errors based on the signals indicative of absolute positions of the one or more motors and based on one or more previously received encoder signals.

7. The motor control system of claim 1, wherein the processing device comprises at least one of an Application Specific Integrated Circuit (ASIC) and a Field Programmable Gate Array (FPGA).

8. The motor control system of claim 1, wherein the signals indicative of absolute positions comprise digital pulse signals generated by the one or more absolute encoders having different resolutions.

9. The motor control system of claim 1, wherein the motor controller is configured to operate the one or more motors in a substantially constant torque mode.

10. A motor-based multi-axis position system, the system comprising:
    one or more motors having a rotor;
    a motor controller for controlling operation of the one or more motors, wherein the motor controller is communicatively coupled to each of the one or more motors;
    one or more encoders configured to detect an absolute position of the one or more motors;
    one or more devices configured to collect inertial data; and
    a processing device coupled to the motor controller, one or more controllers and one or more devices, wherein the processor is configured to:
    receive signals indicative of absolute positions of the one or more motors from the one or more encoders;
    convert the received signals into a format understood by the motor controller;
    send the converted signals to the motor controller; and
    combine the received signals with the collected inertial data to generate positional information.

11. The motor-based position system of claim 10, wherein the processing device is configured to combine the received signals with the inertial data using a Kalman filter.

12. The motor-based position system of claim 10, wherein the processing device comprises at least one of an Application Specific Integrated Circuit (ASIC) and a Field Programmable Gate Array (FPGA) and wherein the combination of the received signals with the inertial data is performed concurrently by a plurality of the hardware processing units instantiated on the processing device.

13. The motor-based position system of claim 10, wherein the one or more motors comprise a multi-axis motor assembly.

14. The motor-based position system of claim 10, wherein the one or more devices configured to collect inertial data comprise at least one of an accelerometer, a gyroscope, and a GPS component.

* * * * *